United States Patent [19]

Johnson et al.

[11] Patent Number: 4,979,231
[45] Date of Patent: Dec. 18, 1990

[54] TWO-WAY RADIO FOR USE IN A COMMUNICATION SYSTEM

[75] Inventors: Brian K. A. Johnson; Stelios J. Patsiokas, both of Plantation, Fla.

[73] Assignee: Motorola, Inc., Schaumburg, Ill.

[21] Appl. No.: 293,919

[22] Filed: Jan. 6, 1989

[51] Int. Cl.$^5$ .......................... H04B 1/44; H04B 7/26
[52] U.S. Cl. ........................................ 455/58; 455/78; 455/221
[58] Field of Search .................. 455/32, 58, 78, 79, 455/83, 221, 218, 212, 80; 340/825.5, 825.51, 825.52

[56] References Cited

U.S. PATENT DOCUMENTS

| | | | |
|---|---|---|---|
| 3,745,462 | 7/1973 | Trimble | 455/11 |
| 4,317,218 | 2/1982 | Perry | 455/54 |
| 4,376,310 | 3/1983 | Stackhouse et al. | 455/58 X |
| 4,494,244 | 1/1985 | Arndt et al. | 455/78 |
| 4,501,617 | 2/1985 | Higgins et al. | 455/78 |
| 4,517,561 | 5/1985 | Burke et al. | 455/58 |
| 4,549,309 | 10/1985 | Corrigan | 455/78 |
| 4,553,263 | 11/1985 | Smith et al. | 455/54 |
| 4,807,222 | 2/1989 | Amitay | 370/105.1 |

OTHER PUBLICATIONS

"EXPO" Series, Handie-Talkie, Portable Radios, Service Manual 68081052C25-O.
Motorola "EXPO" Series, Service Manual 68P81052C25-O Printed 11/87.

Primary Examiner—Douglas W. Olms
Assistant Examiner—Ralph Smith
Attorney, Agent, or Firm—Robert S. Babayi; Thomas G. Berry

[57] ABSTRACT

A two-way radio includes a receiver having a squelch circuit and a selective calling decoder. A transmitter is connected to an inhibit circuit. The inhibit circuit is responsive to the selective calling decoder for permitting transmission after reception of the radio's ID code. The inhibit circuit inhibits further transmissions if the squelch circuit indicates loss of carrier for more than a predetermined time during receive.

3 Claims, 2 Drawing Sheets

TWO-WAY RADIO FOR USE IN A COMMUNICATION SYSTEM

BACKGROUND OF THE INVENTION

This invention relates to two-way radios in general, and particularly to a radio having a transmit inhibit circuit.

A known approach for providing transmit inhibit involves utilizing a receiver squelch circuit to inhibit transmit when a channel activity is detected by the radio. This approach is useful when the radio is within range of other radios using the channel and can therefore detect activity on the channel. In some system applications, radios may not be within receiving range of other radios using the channel, but would still interfere with communication on the channel if they were to transmit.

In a system where a central controller selects a remote site for communication based on signal quality (signal/noise or signal strength) at the remote sites, transmission by another radio in the system can cause the wrong remote site to be selected, thereby disrupting communication on the channel. It is therefore desirable that all radios that are not engaged in communication be inhibited from transmitting in such a system.

SUMMARY OF THE INVENTION:

This radio with transmit inhibit includes means for inhibiting transmission by the radio based upon received control signals. The radio includes a receiver means and a transmitter means. An address detecting means is connected to the receiving means. A transmit inhibit means is connected to the receiver means and is responsive to the address detecting means for enabling transmission by the transmitter means. It is further responsive to the state of an output of the receiver means for inhibiting further transmission by the transmitter means.

In one aspect of the invention, the receiver means includes a squelch circuit providing the output to the transmit inhibit means. In another aspect of the invention the squelch circuit is a carrier squelch. In still another aspect of the invention, the transmit inhibit means includes a timer means for timing the squelch circuit signal, and inhibiting transmission after a predetermined time interval.

DESCRIPTION OF THE PREFERRED EMBODIMENT

Figure 1:
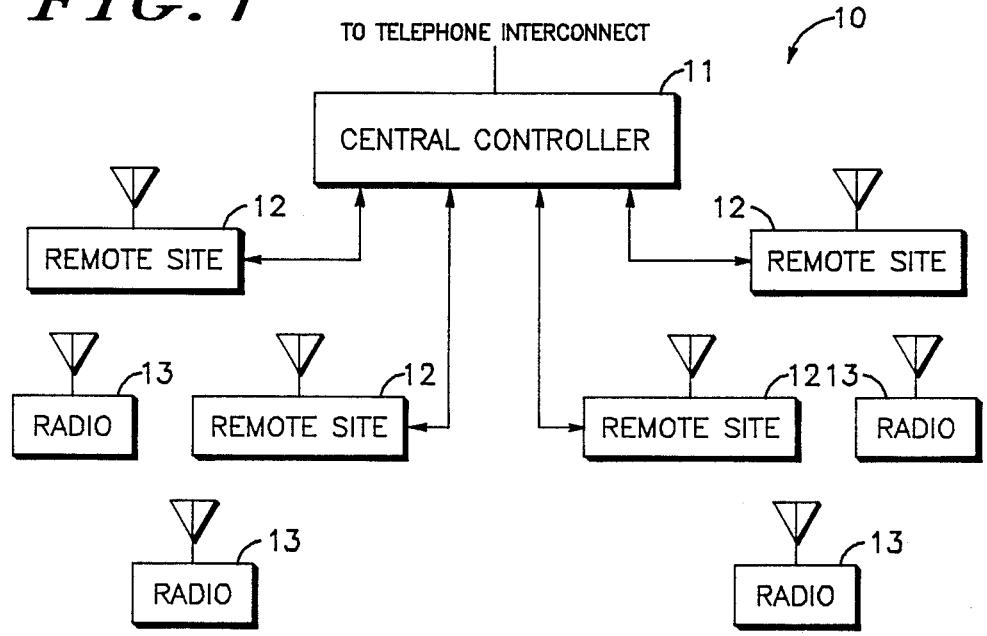
FIG. 1 is a block diagram of a radio communication system in accordance with the present invention.

Referring now by characters of reference to the drawings and first to FIG. 1 where it will be understood that the radio communication system 10 includes a central controller 11 which is connected to a plurality of remote site radios 12. The remote site radios 12 provide radio communication links between radios 13 and the central controller 11 which can also provide telephone interconnect. The system 10 is a local area or on-site communication system, the remote site radios 12 and radios 13 will comprise a low power transmitter and receiver. In such a system, calls originate from the central controller 11 and can be simulcast at each remote site 12. When a called radio 13 responds, further communication is directed through the remote site 12 having the best quality received signal from the called radio 13.

Figure 2:
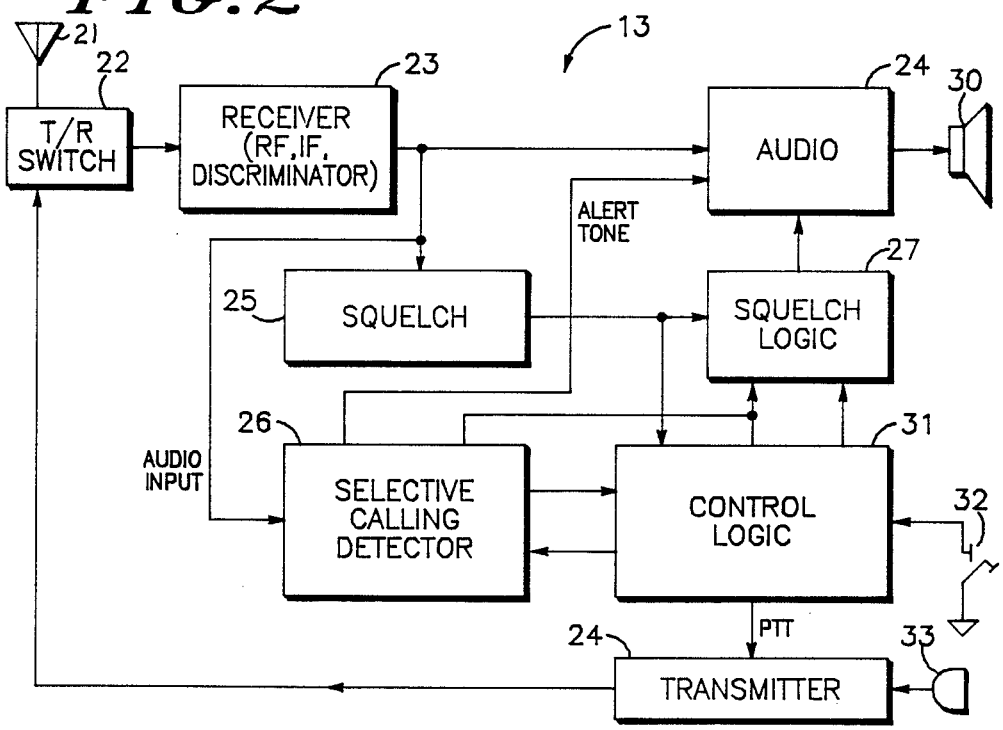
FIG. 2 is a block diagram of a radio transceiver with transmit inhibit in accordance with the present invention.

The block diagram of an individual radio 13 is illustrated in FIG. 2. An antenna 21 is connected by a T/R antenna switch 22 to either a receiver section 23 or a transmitter section 24 of the radio 13. The receiver 23, constituting receiver means, includes conventional receiver RF, IF, and discriminator sections. The output of the discriminator is supplied to audio circuit 24, squelch circuit 25, and selecting calling detector 26. Audio circuit 24 operates under the controls of a squelch logic circuit 27 providing output signals to a speaker 30. The selective calling detector 26, which can comprise any conventional tone or digital detector circuit and constitutes address detecting means, provides an audio alert tone to the audio circuit 24 for signaling when the ID (identification) number of the radio 13 has been received. The squelch circuit 25 is a conventional carrier or noise squelch circuit and provides an output that is applied both to the squelch logic 27 and to control logic 31. All of the components of radio 13, except for control logic 31, can be conventional circuits such as those utilized in MOTOROLA EXPO series portable radios. Such circuits are illustrated in MOTOROLA Service Manual 68P81052C25-O, the disclosure of which is hereby incorporated by reference.

Control logic 31, comprising transmit inhibit means, includes outputs which are applied to a squelch logic 27 and an output that is applied to the selective calling detector 26. Inputs from the selective calling detector 26 and from a push-to-talk switch 32 are also applied to the control logic 31. The control logic 31 has a PTT output which is used for keying the transmitter 24 and switching the T/R switch 22. The T/R switch 22 connects the antenna to the transmitter 24 whenever the transmitter is activated. The microphone 33 is used for applying audio to the transmitter 24 for transmission.

Figure 3:
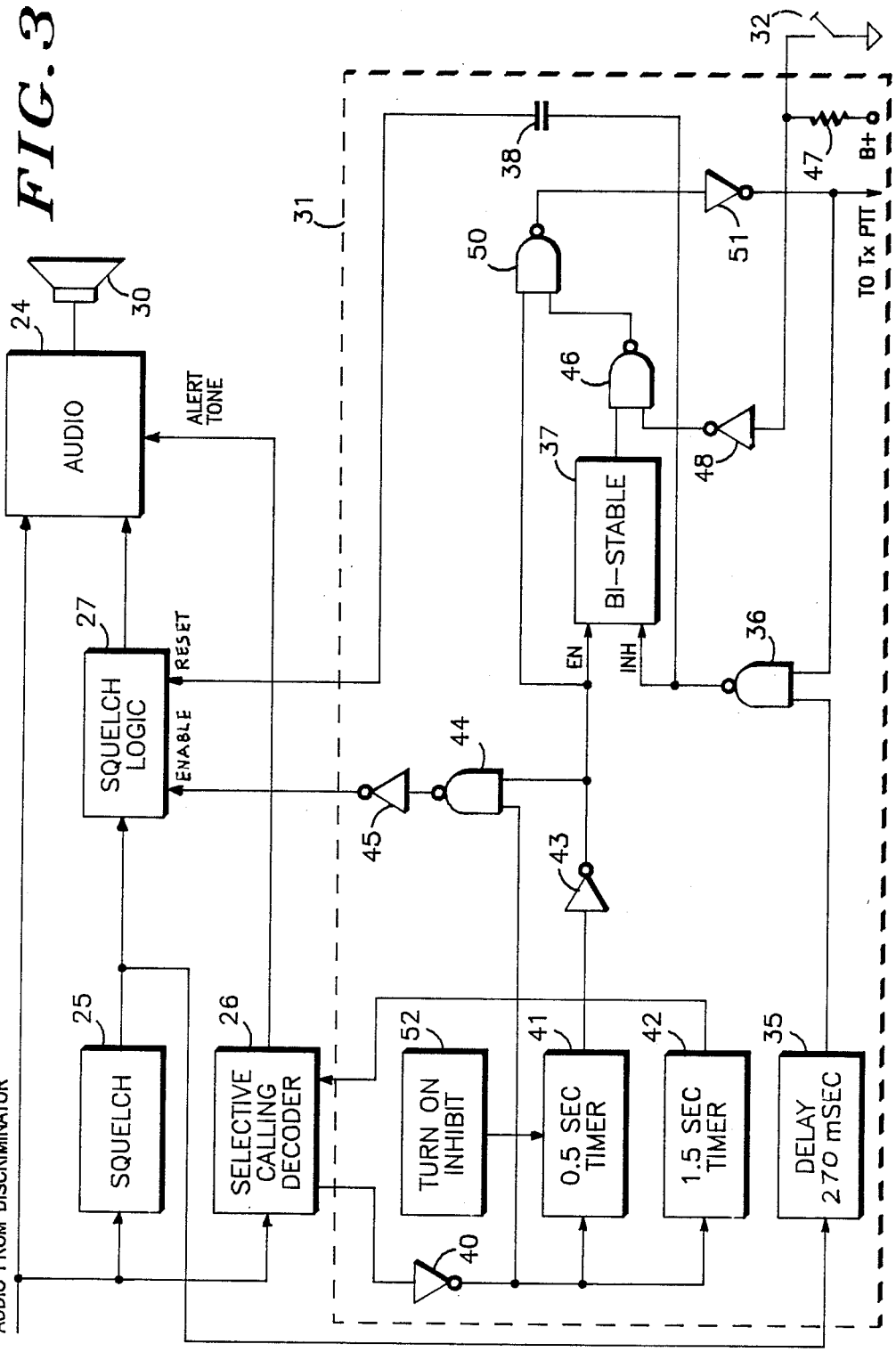
FIG. 3 is a block diagram showing details of the control circuit of FIG. 2.

Further details of the operation of control logic 31 are illustrated in FIG. 3. The output of squelch circuit 25 is applied to a delay circuit 35 of control logic 31 which provides a 270 millisecond delay. The output of delay circuit 35 is connected to an input of a NAND gate 36. The output of NAND gate 36 is connected to an inhibit input of a bi-stable circuit 37 and via a capacitor 38 to the squelch logic 27. One output of the selective calling decoder 26 is coupled via inverter 40 to the input of a 0.5 second timer 41 and to the input of a 1.5 second timer 42. The output of the 0.5 timer 41 is applied by an inverter 43 to the enable input of bi-stable circuit 37. The outputs of inverters 40 and 43 are also applied to inputs of a NAND gate 44 whose output is inverted by inverter 45 and applied to squelch logic 27. The output of the 1.5 second timer 42 is applied to the selective calling decoder 26. The output of bi-stable 37 is connected to an input of a NAND gate 46. Push-to-talk switch 32 selectively switches to ground one side of a pull-up resistor 47 and is also coupled to an input of an inverter 48. The output of inverter 48 is coupled to a second input of NAND gate 46. The output of inverter 43 and the output of NAND gate 46 are provided to inputs of NAND gate 50 whose output is inverted by inverter 51 and provides the push-to-talk signal to transmitter 24 and provides a signal to a second input of NAND gate 36.

In order for the push-to-talk line to transmitter 24 to be activated two conditions must be met. The push-to-talk switch 32 must be closed which provides a high input to NAND gate 46 and the output of bi-stable 37 must be high.

A turn on inhibit circuit 52 is connected to the 0.5 second timer 41 for inhibiting operation of this timer. This circuit 52 is used to prevent operation of the timer 41 at the time the the radio 13 is powered-up. By temporarily disabling timer 41 at the time the radio is powered-up any transient conditions, that might cause timer 41 to enable transmission by enabling bi-stable 37, can be avoided.

In operation, when the selective calling decoder 26 detects the ID code for the radio 13, it provides an alert tone to the audio circuit 24 and provides an output to the timers 41 and 42 as well as NAND gate 44. The 1.5 second timer 42 is utilized to deactivate the selective calling decoder 26 after a 1.5 second interval. This stops the alert tone and puts the squelch logic 27 into a noise squelch mode permitting any transmitted signal on the channel to be heard on the speaker 30 via the audio circuit 24. The rising edge of the start of the 0.5 sec timer 41 becomes a falling edge after inverter 43 which enables the bi-stable 37 and activates the transmitter 24 via NAND gate 50 and inverter 51 for 0.5 seconds.

Selective calling decoder 26 will not yet have been deactivated by the timer 42, and the output from selective calling decoder 26 will not yet have been reset. The squelch logic 27 will not be activated by inverter 45 during the 0.5 seconds that the output of timer 41 is high because inverter 43 keeps one input of NAND gate 44 low for the duration of the timer. This prevents any alert tone until the timer 41 has completed its 0.5 sec pulse. Once timer 41 is done, inverter 45 enables the squelch logic 27 to permit alert tones from the speaker 30. When the 1.5 second timer 42 times out, the alert tone stops and the squelch logic 27 remains in its enable state until a pulse is provided at its reset input. The output from the 0.5 second timer 41 while enabling bi-stable 37, will also actuate the transmitter PTT for 0.5 seconds via NAND gate 50 and inverter 51. This activation of the transmitter 24 is to provide a signal for the remote sites 12 that the central controller 11 can detect to select the site with the best quality signal and use this information to steer a call from the telephone interconnect to the optimum site.

With the bi-stable 37 enabled, the radio 13 is in its transmit enabled state where activation of the push-to-talk switch 32 will permit the transmitter to transmit. The transmitter remains enabled as long as bi-stable 37 is enabled. Inhibiting of bi-stable 37 can only occur while the push-to-talk switch 32 is not actuated and the delay circuit 35 has detected the absence of an rf carrier via the squelch circuit for 270 milliseconds. Consequently, while the push-to-talk switch 32 is open, if the radio 13 detects a carrier on the frequency, such as a signal from a remote site 12 within a 270 milliseconds from the release of the switch, the bi-stable will not be inhibited. If however, carrier signal is not present during receive for 270 milliseconds, then the delay circuit 35 will inhibit the bi-stable 37 via NAND gate 36 and will provide a pulse via capacitor 38 to the reset input of squelch logic 27. This reset signal prevents the squelch logic from actuating the audio circuit 24 until such time as the selective calling decoder 26 again detects its ID code, and the above sequence is repeated.

The transmitter 24 is only enabled if its selective call decoder 26 has detected a call for this particular radio. The radio 13 remains enabled for transmit, by use of the PTT switch, during an entire half-duplex communication as long as there is no loss of carrier during receive for more than 270 milliseconds. The central controller insures that the radio 13 is inhibited at the end of a communication by not transmitting from the remote sites 12 for at least 270 milliseconds which will then cause delay circuit 35 to inhibit the bi-stable circuit 37 via NAND gate 36 and reset the squelch logic 27 via capacitor 38. Since the reset is dependent upon loss of carrier an additional advantage of the circuit is that if the radio 13 is moved out of range of remote sites 12, and thereby looses the carrier or signal, the radio 13 will automatically go into a transmit inhibit state.

The central controller 11 of the system turns the optimum remote site transmitter on within 150 milliseconds of the radio 13 PTT 32 being released, which ensures that the radio does not go into its transmit inhibit state. When a call is timed out by the controller 11, activation of the remote site transmitter ceases, and the condition is set for inhibit to occur either within 270 milliseconds of the remote site carrier shutdown or within 270 milliseconds of the release of the PTT of the radio 13.

We claim as our invention:

1. A two-way radio having an address for use in a communication system comprising:
   receiver means for receiving a carrier signal,
   address detecting means operatively connected to the receiver means for detecting said address,
   carrier detection means for detecting presence or absence of said carrier signal;
   transmitter means,
   transmit inhibit means for enabling transmission by said transmitter means only in response to detection of said address by said address detecting means and subsequently inhibiting further transmission in absence of detecting said carrier signal by said carrier detection means within a predetermined time interval.

2. A two-way radio as defined in claim 1, in which:
   the carrier detection means comprise a squelch circuit having an squelch circuit signal for indicating presence or absence of said carrier signal.

3. A two-way radio as defined in claim 2, in which:
   the transmit inhibit means includes a timer means for timing the squelch circuit signal and inhibiting after a predetermined time interval.

* * * * *

UNITED STATES PATENT AND TRADEMARK OFFICE
CERTIFICATE OF CORRECTION

PATENT NO. : 4,979,231

DATED : December 18, 1990

INVENTOR(S) : Johnson, et al

It is certified that error appears in the above-identified patent and that said Letters Patent is hereby corrected as shown below:

Column 4, line 58, after "inhibiting" and before "after" insert -- transmission --.

Signed and Sealed this

Twenty-eighth Day of July, 1992

Attest:

DOUGLAS B. COMER

*Attesting Officer*   *Acting Commissioner of Patents and Trademarks*